(12) United States Patent
Qi et al.

(10) Patent No.: US 8,248,554 B2
(45) Date of Patent: Aug. 21, 2012

(54) EDGE-LIT BACKLIGHT UNIT WITH THIN PROFILE

(75) Inventors: Jun Qi, Cupertino, CA (US); Victor H. Yin, Cupertino, CA (US); John Z. Zhong, Cupertino, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 517 days.

(21) Appl. No.: 12/488,304

(22) Filed: Jun. 19, 2009

(65) Prior Publication Data
US 2010/0321609 A1 Dec. 23, 2010

(51) Int. Cl.
*G02F 1/1335* (2006.01)
*F21V 7/04* (2006.01)

(52) U.S. Cl. ............ 349/62; 349/65; 362/618; 362/620

(58) Field of Classification Search .................... 349/62, 349/65; 362/618, 620
See application file for complete search history.

(56) References Cited

U.S. PATENT DOCUMENTS

| | | | |
|---|---|---|---|
| 5,914,759 A * | 6/1999 | Higuchi et al. ................ 349/57 |
| 6,874,902 B2 * | 4/2005 | Yamashita et al. ........... 362/620 |
| 7,330,315 B2 | 2/2008 | Nilsen | |
| 7,407,317 B2 | 8/2008 | Lee et al. | |
| 7,452,120 B2 | 11/2008 | Lee et al. | |
| 7,507,011 B2 | 3/2009 | Ueno et al. | |
| 7,578,607 B2 | 8/2009 | Yamashita et al. | |
| 2006/0227259 A1 | 10/2006 | Mi et al. | |
| 2007/0002568 A1 | 1/2007 | Lee et al. | |
| 2007/0019434 A1 | 1/2007 | Lee | |
| 2007/0091637 A1 | 4/2007 | Hiraishi et al. | |
| 2007/0211342 A1 * | 9/2007 | Komatsu et al. ............. 359/566 |
| 2008/0037283 A1 | 2/2008 | Mi et al. | |
| 2008/0130318 A1 | 6/2008 | Park et al. | |
| 2008/0259634 A1 * | 10/2008 | Mi et al. ........................ 362/606 |
| 2009/0009442 A1 | 1/2009 | Galbraith, Jr. et al. | |
| 2009/0097271 A1 | 4/2009 | Chen et al. | |

FOREIGN PATENT DOCUMENTS

CN 1479884 A 3/2004
(Continued)

OTHER PUBLICATIONS

Chinese Official Search Report from related Chinese Utility Model Patent No. ZL201020235591.8 dated Mar. 14, 2011, 6 pgs.
(Continued)

*Primary Examiner* — Mike Qi
(74) *Attorney, Agent, or Firm* — Fletcher Yoder PC

(57) ABSTRACT

An edge-lit backlight unit for a display is provided. In one embodiment, the backlight unit may include a light guide configured to receive light from a source and emit such light in a broad distribution to a turning film disposed over the light guide. The turning film may be configured to redirect light received from the light guide toward a normal of the turning film. In one embodiment, the light guide may be configured such that peak light distribution therefrom occurs at an incident angle of approximately sixty degrees, with broad light distribution substantially occurring over an angular range between incident angles of thirty-five and eighty-five degrees. Additionally, in one embodiment, the turning film may include multiple prisms that receive and redirect the light emitted from the light guide, and that include apex angles of less than or about sixty degrees. Additional edge-lit backlight units and methods are also disclosed.

29 Claims, 10 Drawing Sheets

FOREIGN PATENT DOCUMENTS

| | | | |
|---|---|---|---|
| CN | 1878984 | A | 12/2006 |
| EP | 0500960 | A1 | 9/1992 |
| EP | 0317250 | A2 | 4/1994 |
| EP | 0632229 | A1 | 1/1995 |
| EP | 1348994 | * | 1/2003 |
| EP | 1348994 | A1 | 10/2003 |
| JP | 2002-022966 | A | 1/2002 |
| KR | 10-2005-0085345 | A | 8/2005 |

OTHER PUBLICATIONS

Combined Search and Examination Report for GB Application No. 1009693.1 dated Sep. 22, 2010, 7 pgs.

International Search Report and Written Opinion dated Sep. 29, 2010 for PCT Application No. PCT/US2010/036447 (16 pgs.).

Korean Preliminary Rejection for Korean Application No. 10-2012-7000906 dated Jun. 8, 2012, 7 pgs.

* cited by examiner

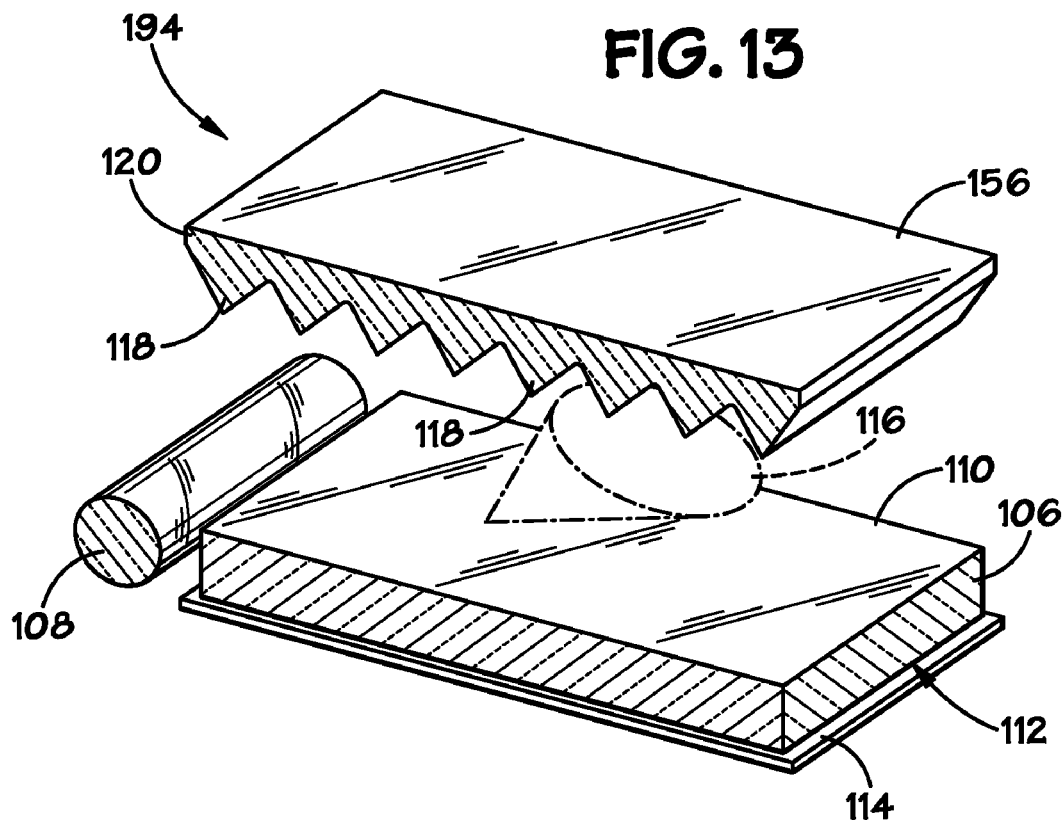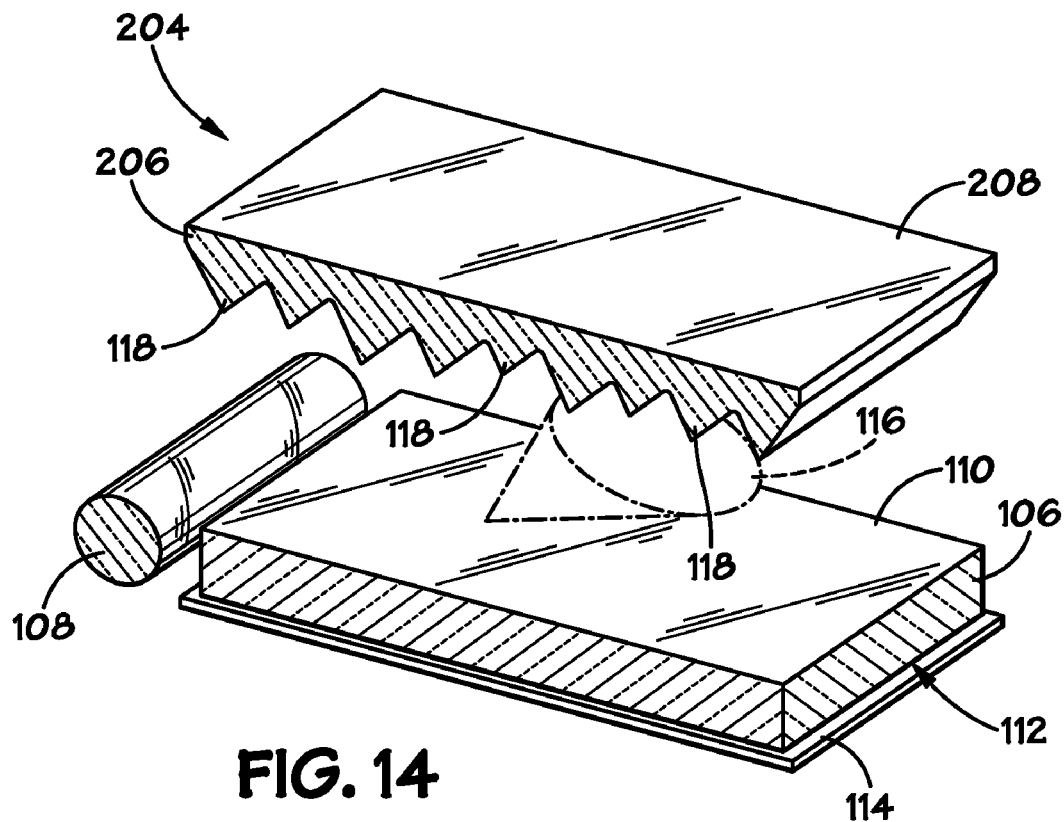

EDGE-LIT BACKLIGHT UNIT WITH THIN PROFILE

BACKGROUND

1. Technological Field

This relates generally to backlight units of electronic display panels, such as liquid crystal displays.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

LCDs typically include an LCD panel having, among other things, a liquid crystal layer and various circuitry for controlling orientation of liquid crystals within the layer to modulate an amount of light passing through the LCD panel. Further, while certain LCDs may operate by reflecting and modulating passage of light from a source positioned in front of the LCD panel (e.g., ambient light), many LCDs include a light source, such as an internal light source, that illuminates the LCD panel from behind. For example, in a direct-lit backlight configuration, a light source (e.g., a lamp or light emitting diodes) is provided behind, and directs light to, an LCD panel. To reduce the thickness of the LCD, an edge-lit backlight configuration may instead be used, in which the light source is oriented to illuminate an edge of a light guide, which in turn distributes such light to the LCD panel. While edge-lit backlights are generally thinner than direct-lit backlights, various conventional edge-lit backlights may exhibit certain disadvantages, such as reduced brightness and/or narrow acceptable viewing angles.

SUMMARY

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

The present disclosure generally relates to an edge-lit backlight unit for a display. In one embodiment, the edge-lit backlight unit includes a light guide that receives light from a light source, and emits this light in a broad distribution to a turning film. In one embodiment, the light guide includes anisotropic optical elements that refract light such that the light emitted to the turning film falls within a broad distribution, such as over a range of approximately fifty degrees. Additionally, the turning film may be configured to redirect this broad distribution of light toward a normal direction with respect to the backlight unit. In one embodiment, an edge-lit backlight unit may exhibit increased luminance, improved viewing angles, or both when compared to conventional edge-lit backlight units. Additionally, in one embodiment, the edge-lit backlight unit may be thinner than certain conventional edge-lit backlight units.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

Advantages of the present disclosure may become apparent upon reading the following detailed description and upon reference to the drawings in which:

FIG. 13 is a partially exploded view generally depicting a backlight unit that does not include a diffusion layer over a turning film of the backlight unit in accordance with aspects of the present disclosure;

FIG. 14 is a partially exploded view generally depicting a backlight unit having a turning film that includes differently-shaped prisms in accordance with aspects of the present disclosure;

DETAILED DESCRIPTION OF SPECIFIC EMBODIMENTS

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

The present application is generally directed to edge-lit backlight units for displays. Particularly, the present application discloses edge-lit backlight units that provide improved luminance in a thinner profile compared to certain traditional backlight units employing brightness enhancement films. Additionally, the presently disclosed backlight units may also exhibit better viewing angle performance than other traditional backlight units. As discussed in greater detail below, in some embodiments, edge-lit backlight units in accordance with the present techniques include a light guide that emits light in a broad distribution to a turning film, which generally operates to redirect such light out of the backlight unit, such as to an LCD panel of a display.

Figure 1:
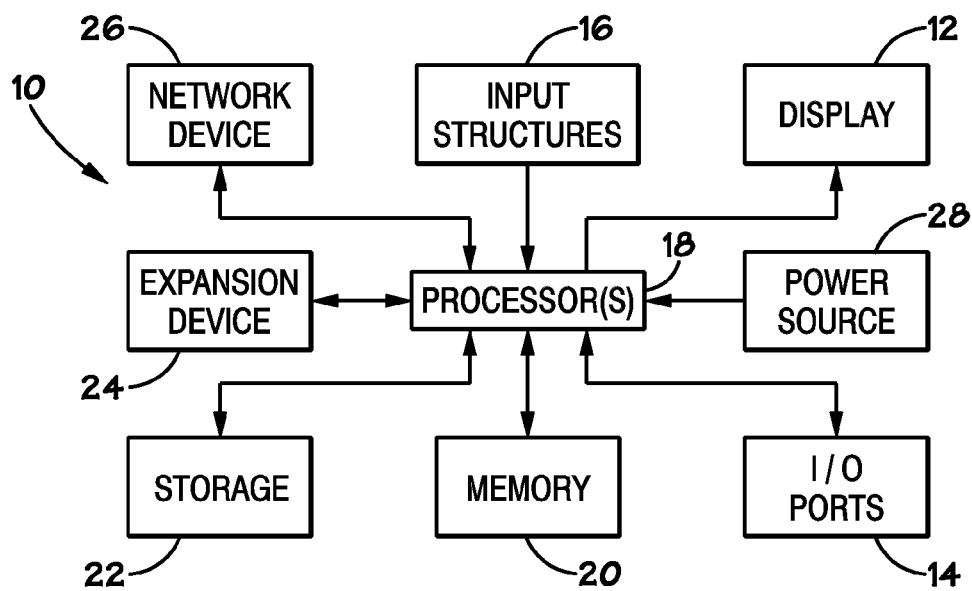
FIG. 1 is a block diagram of exemplary components of an electronic device, in accordance with aspects of the present disclosure.

With these foregoing features in mind, a general description of electronic devices that may employ such an edge-lit backlight unit is provided below. As may be appreciated, electronic device may include various internal and/or external components which contribute to the function of the device. For instance, FIG. 1 is a block diagram illustrating components that may be present in one such electronic device 10, and which may allow device 10 to function in accordance with the techniques discussed herein. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. It should further be noted that FIG. 1 is merely one example of a particular implementation and is merely intended to illustrate the types of components that may be present in electronic device 10. For example, in the presently illustrated embodiment, these components may include display 12, I/O ports 14, input structures 16, one or more processors 18, memory device 20, non-volatile storage 22, expansion card(s) 24, networking device 26, and power source 28.

With regard to each of these components, it is first noted that display 12 may be used to display various images generated by device 10. In various embodiments, display 12 may be a liquid crystal display (LCD), a cathode ray tube (CRT) display, or any other suitable display. Additionally, in certain embodiments of electronic device 10, display 12 may be provided in conjunction with a touch-sensitive element, such as a touchscreen, that may be used as part of the control interface for device 10.

I/O ports 14 may include ports configured to connect to a variety of external devices, such as a power source, headset or headphones, or other electronic devices (such as handheld devices and/or computers, printers, projectors, external displays, modems, docking stations, and so forth). I/O ports 14 may support any interface type, such as a universal serial bus (USB) port, a video port, a serial connection port, an IEEE-1394 port, an Ethernet or modem port, and/or an AC/DC power connection port.

Input structures 16 may include the various devices, circuitry, and pathways by which user input or feedback is provided to processor(s) 18. Such input structures 16 may be configured to control a function of electronic device 10, applications running on device 10, and/or any interfaces or devices connected to or used by device 10. For example, input structures 16 may allow a user to navigate a displayed user interface or application interface. Non-limiting examples of input structures 16 include buttons, sliders, switches, control pads, keys, knobs, scroll wheels, keyboards, mice, touchpads, and so forth. User interaction with input structures 16, such as to interact with a user or application interface displayed on display 12, may generate electrical signals indicative of user input. These input signals may be routed via suitable pathways, such as an input hub or bus, to processor(s) 18 for further processing.

Additionally, in certain embodiments, one or more input structures 16 may be provided together with display 12, such an in the case of a touchscreen, in which a touch sensitive mechanism is provided in conjunction with display 12. In such embodiments, the user may select or interact with displayed interface elements via the touch sensitive mechanism.

In this way, the displayed interface may provide interactive functionality, allowing a user to navigate the displayed interface by touching display 12.

Processor(s) 18 may provide the processing capability to execute the operating system, programs, user and application interfaces, and any other functions of the electronic device 10. Processor(s) 18 may include one or more microprocessors, such as one or more "general-purpose" microprocessors, one or more special-purpose microprocessors and/or ASICS, or some combination of such processing components. For example, processor(s) 18 may include one or more reduced instruction set (RISC) processors, as well as graphics processors, video processors, audio processors, and the like. As will be appreciated, processor(s) 18 may be communicatively coupled to one or more data buses or chipsets for transferring data and instructions between various components of electronic device 10.

Programs or instructions executed by processor(s) 18 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by processor(s) 18 to enable device 10 to provide various functionalities, including those described herein.

The instructions or data to be processed by processor(s) 18 may be stored in a computer-readable medium, such as memory 20. Memory 20 may include a volatile memory, such as random access memory (RAM), and/or a non-volatile memory, such as read-only memory (ROM). Memory 20 may store a variety of information and may be used for various purposes. For example, memory 20 may store firmware for electronic device 10 (such as basic input/output system (BIOS)), an operating system, and various other programs, applications, or routines that may be executed on electronic device 10. In addition, memory 20 may be used for buffering or caching during operation of the electronic device 10.

The components of device 10 may further include other forms of computer-readable media, such as non-volatile storage 22 for persistent storage of data and/or instructions. Non-volatile storage 22 may include, for example, flash memory, a hard drive, or any other optical, magnetic, and/or solid-state storage media. Non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards 24 that may be used to add functionality, such as additional memory, I/O functionality, or networking capability, to electronic device 10. Such expansion cards 24 may connect to device 10 through any type of suitable connector, and may be accessed internally or external to the housing of electronic device 10. For example, in one embodiment, expansion cards 24 may include a flash memory card, such as a SecureDigital (SD) card, mini- or microSD, CompactFlash card, Multimedia card (MMC), or the like. Additionally, expansion cards 24 may include one or more processor(s) 18 of the device 10, such as a video graphics card having a GPU for facilitating graphical rendering by device 10.

The components depicted in FIG. 1 also include network device 26, such as a network controller or a network interface card (NIC). In one embodiment, network device 26 may be a wireless NIC providing wireless connectivity over any 802.11 standard or any other suitable wireless networking standard. Network device 26 may allow electronic device 10 to communicate over a network, such as a personal area network (PAN), a local area network (LAN), a wide area network (WAN), or the Internet. Further, electronic device 10 may connect to and send or receive data with any device on the network, such as portable electronic devices, personal computers, printers, and so forth. Alternatively, in some embodiments, electronic device 10 may not include a network device 26. In such an embodiment, a NIC may be added as one expansion card 24 to provide similar networking capability as described above.

Further, device 10 may also include power source 28. In one embodiment, power source 28 may be one or more batteries, such as a lithium-ion polymer battery or other type of suitable battery. The battery may be user-removable or may be secured within the housing of electronic device 10, and may be rechargeable. Additionally, power source 28 may include AC power, such as provided by an electrical outlet, and electronic device 10 may be connected to power source 28 via a power adapter. This power adapter may also be used to recharge one or more batteries of device 10.

Figure 2:
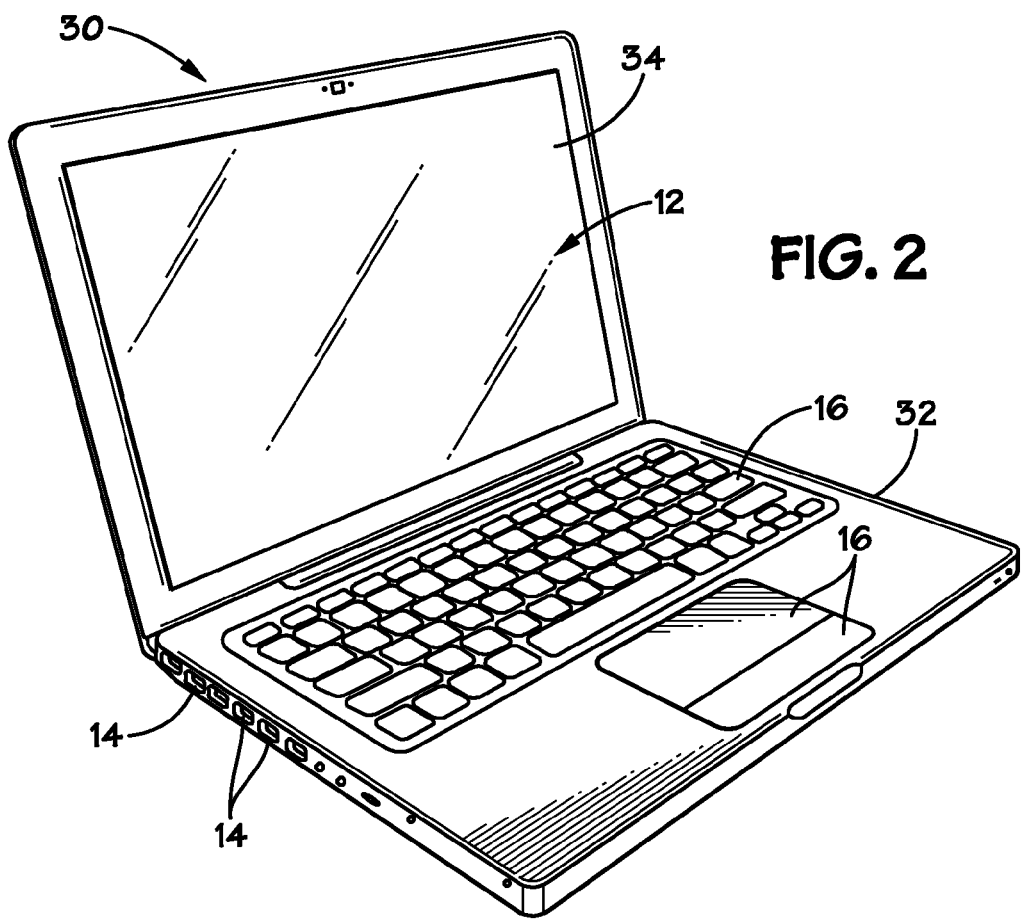
FIG. 2 is a perspective view of a computer in accordance with aspects of the present disclosure.

Electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may be a model of a MacBook®, MacBook® Pro, MacBook Air®, iMac®, Mac® mini, or Mac Pro® available from Apple Inc. of Cupertino, Calif. By way of example, electronic device 10 in the form of laptop computer 30 is illustrated in FIG. 2 in accordance with one embodiment. Depicted computer 30 includes housing 32, display 12 (e.g., LCD 34 or some other suitable display), input/output ports 14, and input structures 16.

In one embodiment, input structures 16 (such as a keyboard and/or touchpad) may be used to interact with computer 30, such as to start, control, or operate a graphical user interface (GUI) or applications running on computer 30. For example, a keyboard and/or touchpad may allow a user to navigate a user interface or application interface displayed on display 12.

As depicted, electronic device 10 in the form of computer 30 may also include various I/O ports 14 to allow connection of additional devices. For example, I/O ports 14 may include a USB port, a DVI port, or some other port suitable for connecting to another electronic device, a projector, a supplemental display, and so forth. In addition, computer 30 may include network connectivity, memory, and storage capabilities, as described with respect to FIG. 1. As a result, computer 30 may store and execute a GUI and other applications.

Figure 3:
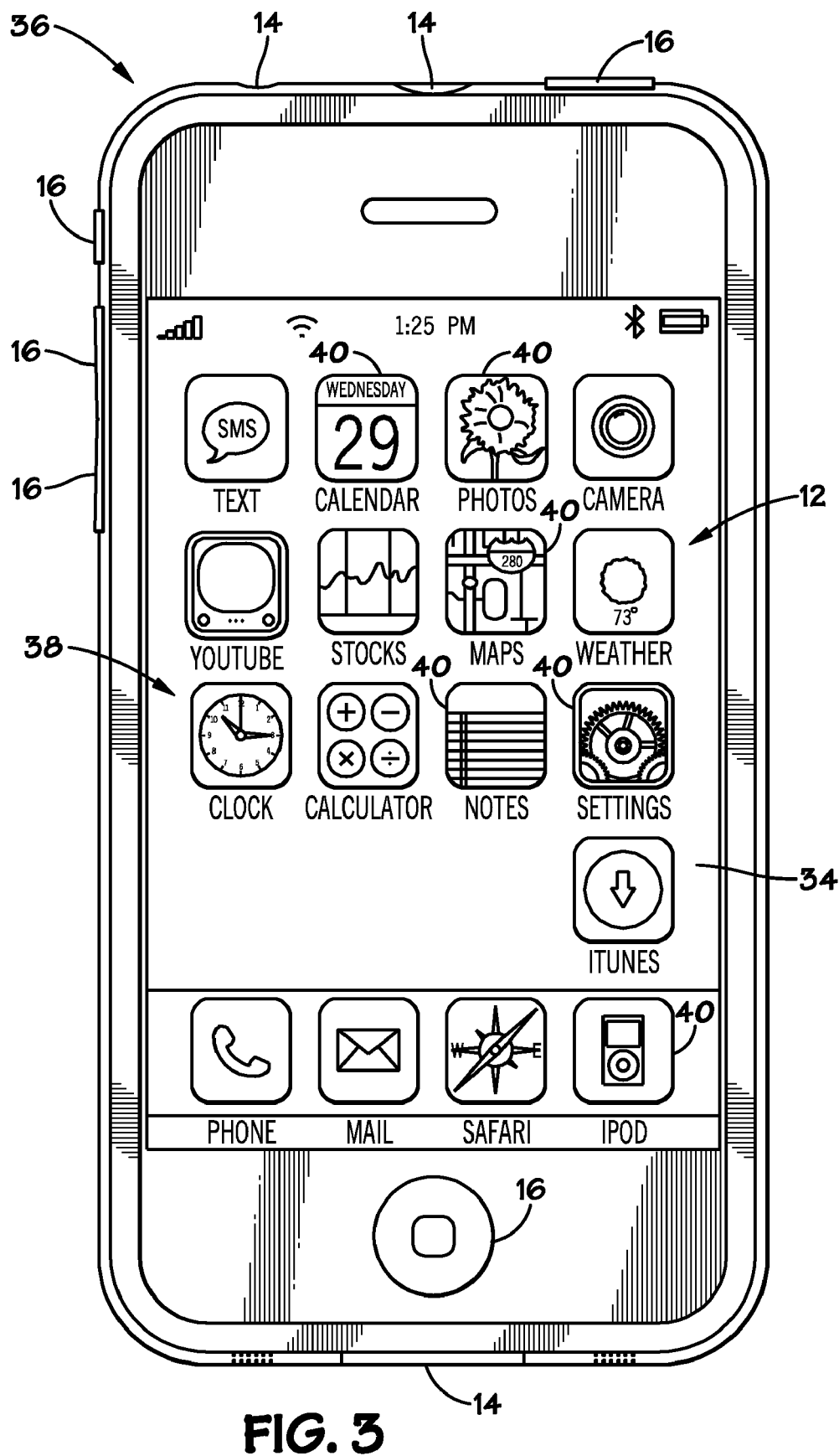
FIG. 3 is a perspective view of a handheld electronic device in accordance with aspects of the present disclosure.

Although electronic device 10 is generally depicted in the context of a computer in FIG. 2, electronic device 10 may also take the form of other types of electronic devices. In some embodiments, various electronic devices 10 may include cellular telephones, media players for playing music and/or video, personal data organizers, handheld game platforms, cameras, and/or combinations of such devices. For instance, as generally depicted in FIG. 3, device 10 may be provided in the form of handheld electronic device 36 that includes various functionalities (such as the ability to take pictures, make telephone calls, access the Internet, communicate via email, record audio and/or video, listen to music, play games, connect to wireless networks, and so forth). By way of further example, handheld device 36 may be a model of an iPod® or iPhone® available from Apple Inc. In other embodiments, however, other types of handheld devices (such as other media players for playing music and/or video, personal data organizers, handheld game platforms, and/or combinations of such devices) may also be suitably provided as electronic device 10.

Handheld device 36 of the presently illustrated embodiment includes an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within handheld device 36 to facilitate wireless communication.

Handheld electronic device 36 also may include various input and output (I/O) ports 14 that allow connection of the handheld device 36 to external devices. For example, one I/O port 14 may be a port that allows the transmission and reception of data or commands between the handheld electronic device 36 and another electronic device, such as a computer. Such an I/O port 14 may be a proprietary port from Apple Inc. or may be an open standard I/O port.

In the depicted embodiment, the enclosure includes user input structures 16 through which a user may interface with the device. Each user input structure 16 may be configured to help control a device function when actuated. For example, in a cellular telephone implementation, one or more input structures 16 may be configured to invoke a "home" screen or menu to be displayed, to toggle between a sleep and a wake mode, to silence a ringer for a cell phone application, to increase or decrease a volume output, and so forth.

In the depicted embodiment, handheld device 36 includes display 12, which may be in the form of LCD 34. Such LCD 34 may be used to display graphical user interface (GUI) 38 that allows a user to interact with handheld device 36. GUI 38 may include various layers, windows, screens, templates, or other graphical elements that may be displayed in all, or a portion, of LCD 34. Generally, GUI 38 may include graphical elements that represent applications and functions of the electronic device, such as icons 40, as well as other images representing buttons, sliders, menu bars, and the like. Icons 40 may correspond to various applications of the electronic device that may open upon selection of a respective icon 40. Furthermore, selection of a particular icon 40 may lead to a hierarchical navigation process, such that selection of the particular icon 40 leads to a screen that includes one or more additional icons or other GUI elements. Icons 40 may be selected via a touchscreen included in display 12, or may be selected by one or more user input structures 16, such as a wheel or button. Of course, LCD 34 may also be used to display other data, images, or visual outputs.

Figure 4:
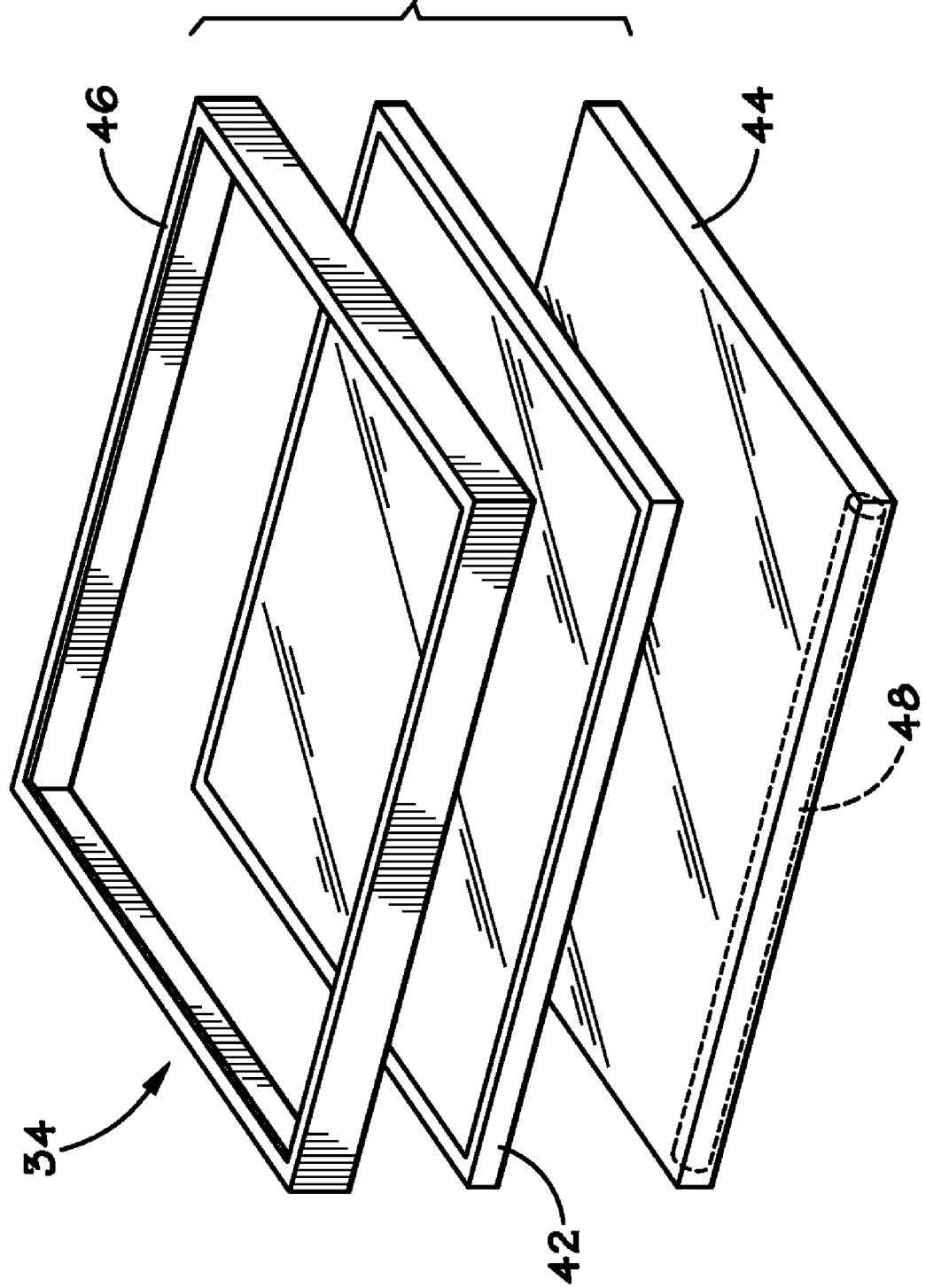
FIG. 4 is an exploded view of a liquid crystal display (LCD) including a backlight unit in accordance with aspects of the present disclosure.

One example of LCD display 34 is depicted in FIG. 4 in accordance with one embodiment. LCD display 34 generally includes LCD panel 42 and backlight unit 44, which may be assembled within frame 46. As may be appreciated, LCD panel 42 may include numerous pixels configured to selectively modulate the amount and color of light passing from backlight unit 44 through LCD panel 42. For example, LCD panel 42 may include a liquid crystal layer, one or more thin film transistor layers configured to control orientation of liquid crystals of the liquid crystal layer via an electric field, and polarizing films, which cooperate to enable LCD panel 42 to control the amount of light emitted by each pixel. Additionally, LCD panel 42 may include color filters that allow specific colors of light to be emitted from the pixels (e.g., red, green, and blue). LCD panel 42 may be a twisted nematic (TN) panel, an in-plane switching (IPS) panel, a fringe-field switching (FFS) panel, a vertical alignment panel (e.g., a multi-domain vertical alignment (MVA) panel or a patterned vertical alignment (PVA) panel), variants of the foregoing types of panel, or any other suitable panel.

As discussed in greater detail below, backlight unit 44 includes light source 48. Light from light source 48 is routed through portions of backlight unit 44 (e.g., a light guide and optical films) and generally emitted toward LCD panel 42. In various embodiments, light source 48 may include a cold-cathode fluorescent lamp (CCFL), one or more light emitting diodes (LEDs), or any other suitable source(s) of light. Although various LCD displays 34 may be incorporated into computers 30 or handheld devices 36, it is noted that other LCD displays 34 may be incorporated into televisions, computer monitors, and other types of devices.

Figure 5:
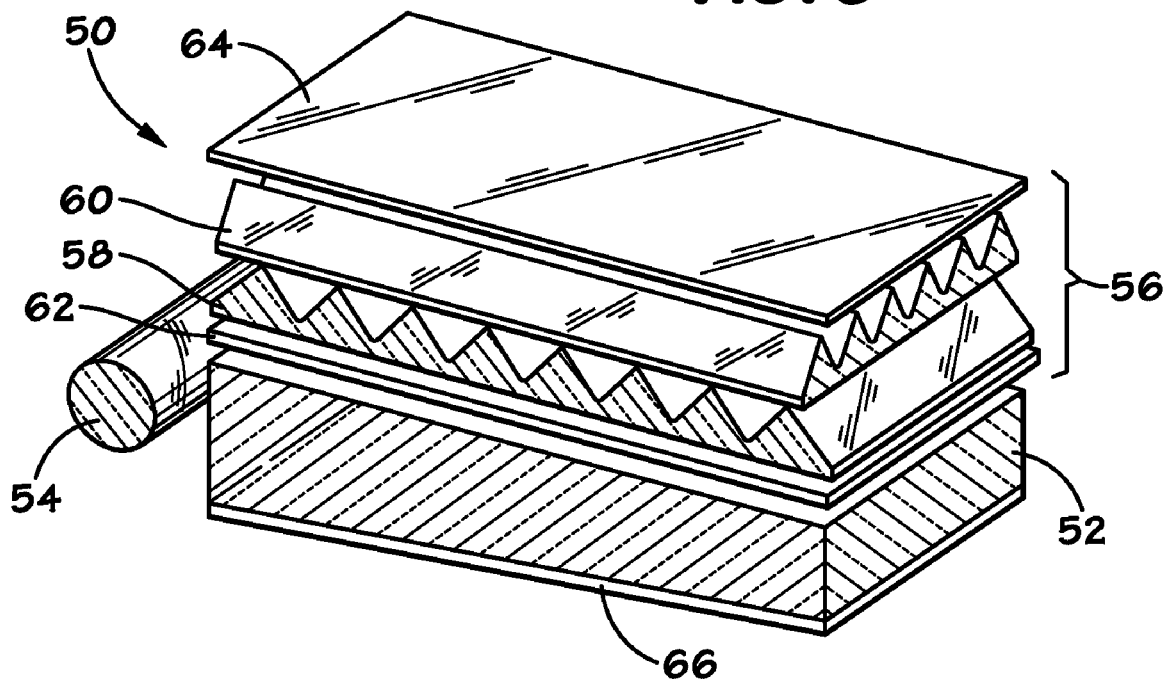
FIG. 5 depicts an example of a backlight unit including a wedge-shaped light guide and brightness enhancement films.
Figure 6:
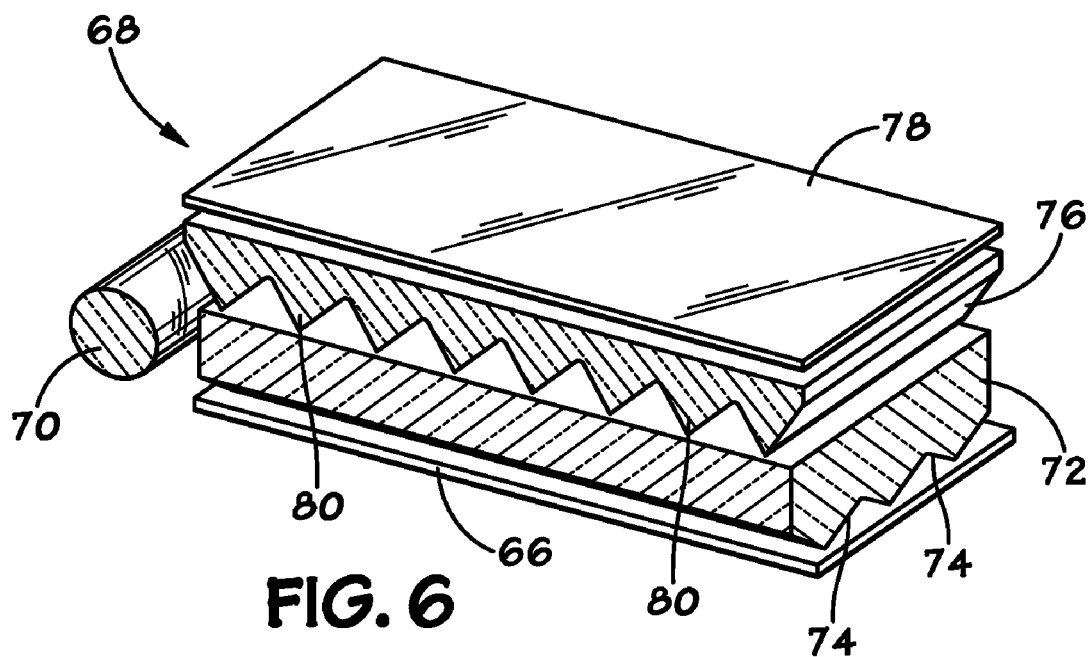
FIG. 6 depicts another example of a backlight unit including a light guide having prismatic features and a turning film having prisms configured to receive light from the light guide.

More detailed examples of portions of backlight units are depicted in FIGS. 5 and 6. In both of these figures, the illustrated backlight units are edge-lit backlight units. In such edge-lit backlight units, a light source is positioned to provide light to a lateral edge of a light guide, which emits light from an emission surface (e.g., an upper surface of the light guide). For instance, backlight unit 50 of FIG. 5 includes light guide 52, such as a light guiding plate, positioned adjacent light source 54. Although light source 54 is generally depicted as a portion of a CCFL, light source 54 may also or instead include any suitable light source, such as LEDs.

Light from light source 54 may generally propagate through light guide 52 via total internal reflection at upper and lower surfaces of light guide 52, and may ultimately be emitted therefrom toward various optical films 56. For example, light guide 52 may include certain optical features on either or both of the upper and lower surfaces of light guide 52 that disrupt total internal reflection, allowing light to pass from light guide 52 to optical films 56. Such optical features may include, for example, printed dots or micro-lenses on either or both of the upper and lower surfaces of light guide 52. In other instances, however, the generally wedge-shaped light guide 52 may gradually decrease the angle of incidence of the reflected light, eventually allowing the light to escape light guide 52. Although depicted as generally wedge-shaped in FIG. 5, it is noted that light guide 52 may be provided in other forms, such as a generally planar light guide.

For backlight units 50 in which light guide 52 includes printed dots or micro-lenses, such optical features typically scatter light over a very broad range of distribution (i.e., greater than ninety degrees). Optical films 56 may function to focus this very broad light distribution for output to an LCD panel, thereby increasing apparent brightness of the LCD panel. For instance, optical films 56 may include brightness enhancement films 58 and 60, which generally increase "on-axis" brightness (i.e., the brightness of backlight unit 50 along a normal of an upper surface of backlight unit 50). Such brightness enhancement films 58 and 60 typically include prisms formed on an upper surface of such films and generally directed away from light guide 52, as generally depicted in FIG. 5.

Brightness enhancement films 58 and 60 generally increase on-axis brightness of backlight unit 50 by permitting certain received light to be emitted within a desired viewing range about the normal, while the other received light may be recycled by reflecting the light toward reflector 66. For example, the lower surface of brightness enhancement film 58 may reflect light incident at an angle greater than the critical angle of the surface, and may refract light incident at an angle less than the critical angle. Of light refracted by the lower surface, some of this light may be reflected back toward light guide 52 by one or more surfaces of the prisms of brightness enhancement film 58, while other light will be emitted from the prisms. Brightness enhancement film 60 may operate in a similar manner.

Light reflected from brightness enhancement films 58 and 60 may be again reflected by reflector 66 back toward brightness enhancement films 58 and 60. This recycled light may then pass through the brightness enhancement films 58 and 60 or may again be reflected, depending on the angle at which the recycled light approached such films. Backlight unit 50 may also include diffuser layers 62 and 64 to scatter light and provide a more uniform light distribution from backlight unit 50. Backlight unit 50, and other backlights similarly having a light guide that emits light over a very broad distribution range and one or more brightness enhancement films for increasing on-axis brightness, is typically referred to as a "PMMA" backlight, generally named for the material commonly used to form light guide 52 (i.e., polymethyl-methacrylate, an acrylic glass). It is noted, however, that light guide 52 may be formed of other suitable materials.

In the example depicted in FIG. 6, backlight unit 68 includes light source 70 configured to output light to light guide 72. Light guide 72 includes a multiple micro-prisms 74 that disrupt total internal reflection of light received from light source 70, causing such light to be emitted from light guide 72 (either directly or via reflection from reflector 66) toward turning film 76 and diffuser layer 78. Such backlight units including a light guide having micro-prisms and one or more turning films to redirect light from the light guide are typically referred to as prism backlight units. Unlike the very broad light distribution from light guide 52 discussed above with respect to the PMMA backlight of FIG. 5, light guide 72 instead emits light from its upper surface to turning film 76 in a very narrow distribution range (i.e., less than or approximately equal to thirty degrees). Turning film 76 includes small prisms 80 formed on a lower surface of turning film 76 and generally projecting toward adjacent light guide 72. Rather than operating to focus a very broad distribution of light, such as discussed above with respect to brightness enhancement films 58 and 60, turning film 76 operates to receive the very narrow distribution of light and generally redirects such light toward a normal of a display including backlight unit 68, thereby allowing on-axis viewing by a user of such a display.

Figure 7:
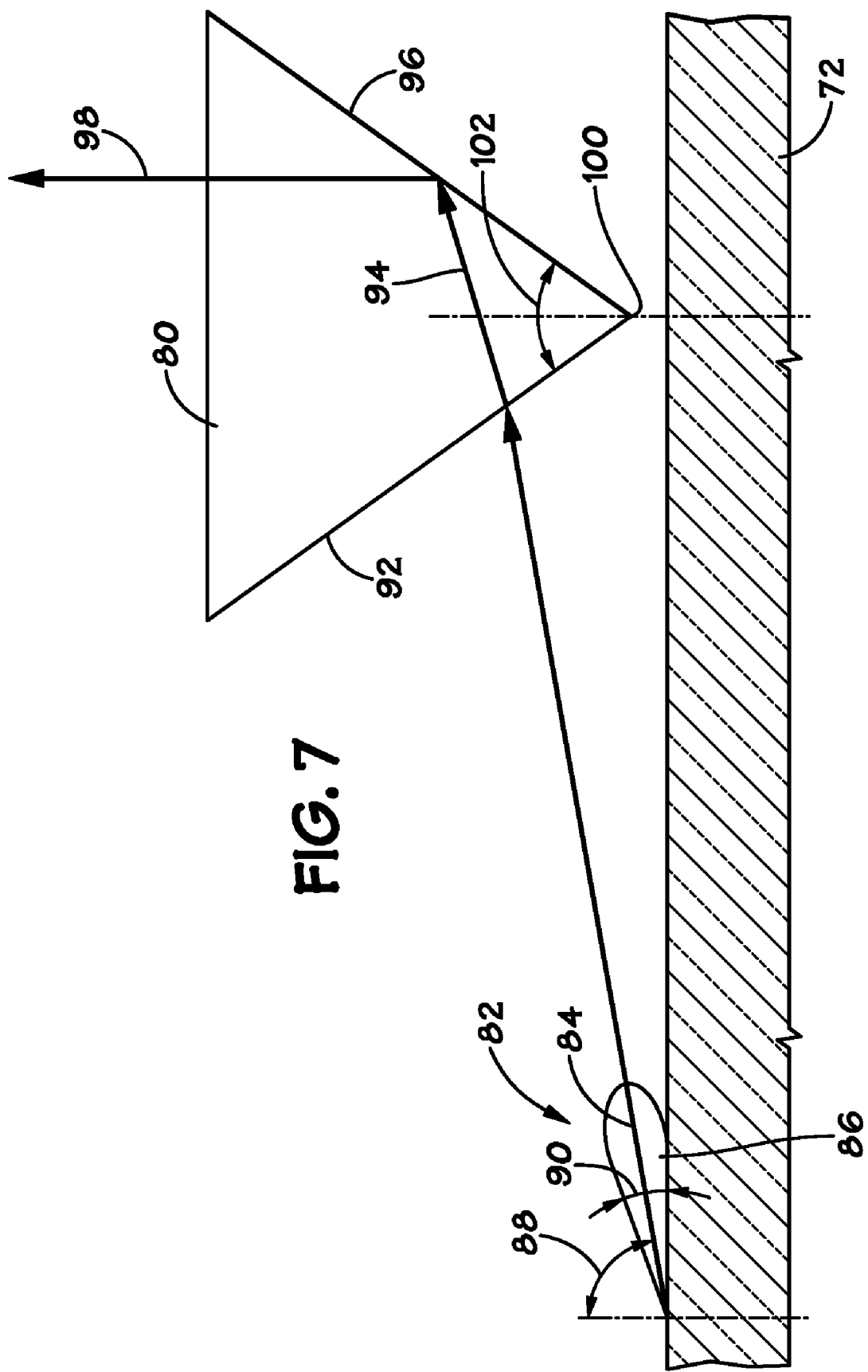
FIG. 7 generally illustrates the turning of a narrow distribution of light emitted from the light guide of FIG. 6 by a prism of the turning film also of FIG. 6.

Such operation may be better understood with reference to FIG. 7, which generally depicts the redirection of light from light guide 72 by a single prism 80 in prism backlight unit 68. In such units, rays of light 82 emitted from light guide 72 may be directed toward prism 80. Light output from light guide 72 may include a peak direction of transmittance 84, and such light may substantially fall within distribution range 86. In backlight unit 68, and in other prism backlight units, light is emitted from light guide 72 at a steep incident angle 88 (e.g., approximately seventy-five degrees) and falls within a narrow range of distribution generally represented by angle 90 (e.g., less than or approximately equal to thirty degrees).

Light 82 received at surface 92 of prism 80 is refracted toward surface 96, as generally indicated by reference numeral 94. Such light 82 may then be reflected by surface 96 and redirected to pass through turning film 76 (as well as additional layers of a display), as generally indicated by reference numeral 98. Prism 80 may include apex 100 formed by the intersection of surfaces 92 and 96, and apex 100 may define apex angle 102. Traditionally, prism 80 is formed such that apex angle 102 is substantially equal to sixty-eight degrees.

As previously noted, displays including prism backlight units often exhibit greater brightness than PMMA backlight units when viewed from a typical viewing angle (e.g., at a normal to the backlight unit and display), while PMMA backlights typically provide better viewing angles (e.g., less image distortion when viewing, at a wide angle, an image on a display including a backlight) than prism backlight units. In accordance with the present techniques, however, various backlight units that may provide greater brightness than traditional PMMA backlight units and wider viewing angles than traditional prism backlight units are described below with reference to FIGS. 8-17.

Figure 8:
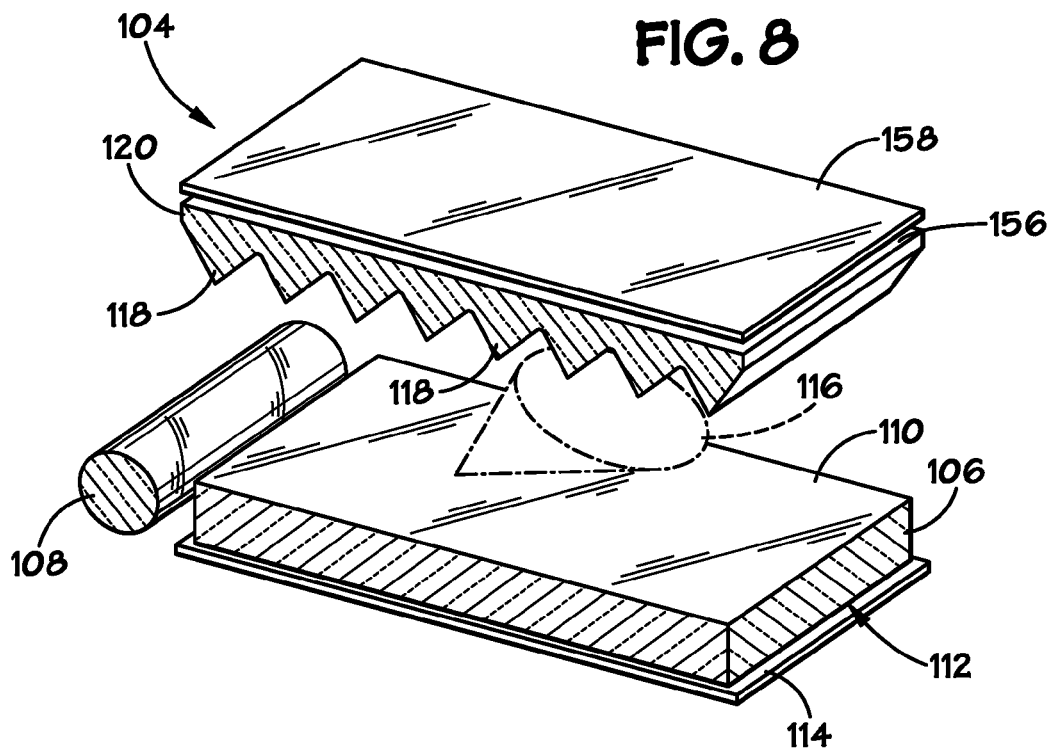
FIG. 8 is a partially exploded view generally depicting a backlight unit having a light guide that emits light over a broader distribution range than that of FIGS. 6 and 7, in accordance with aspects of the present disclosure.

For example, backlight unit 104, which may provide enhanced viewing angles in comparison to backlight unit 68, is depicted in FIG. 8 in accordance with one embodiment. Backlight unit 104 includes light guide 106 configured to receive light on an edge thereof from light source 108, such as one or more LEDs or a CCFL. Light guide 106 includes upper emission surface 110, from which light is emitted toward other layers of backlight unit 104, and lower surface 112. Backlight unit 104 may also include reflector 114 configured to direct light toward emission surface 110. Reflector 114 may include a specular reflector or a diffuse (e.g., Lambertian) reflector. As discussed in greater detail below, light guide 106 may be configured with anisotropic optical elements that allow light to escape light guide 106 in distribution range 116 broader than that of light emitted from light guide 72 discussed above. The light emitted from light guide 106 is generally directed toward prisms 118 formed on a lower surface of turning film 120. Prisms 118 may be arranged on turning film 120 in a periodic manner or with some degree of apparent randomness. Additionally, prisms 118 may be substantially linear along their axial length, or may include curvature (e.g., a wave pattern).

Figure 9:
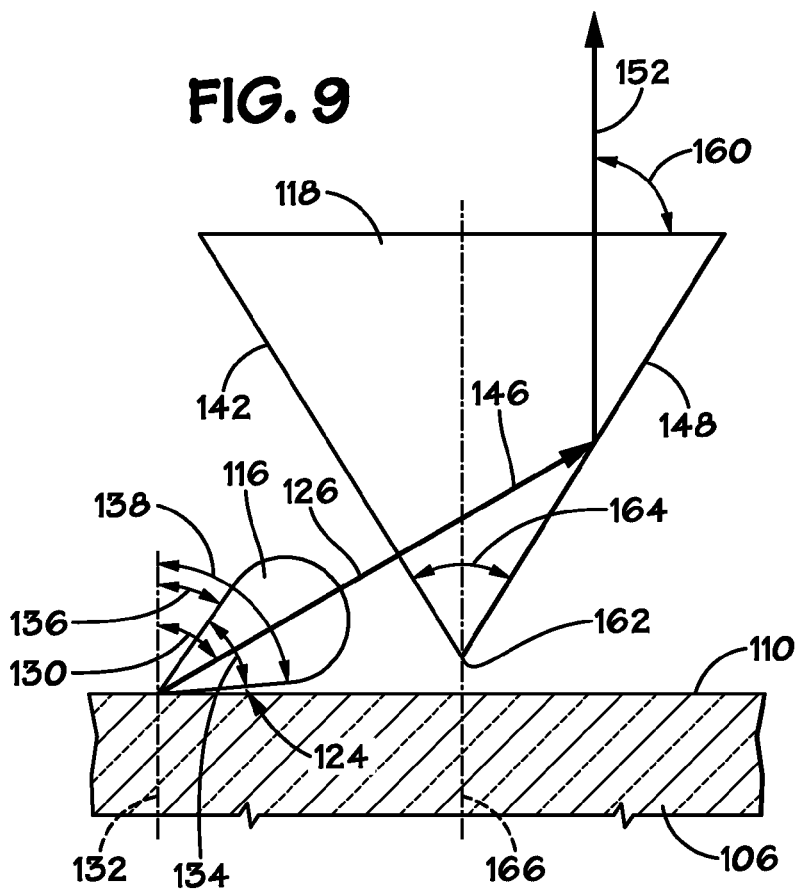
FIG. 9 generally illustrates the turning of the broad distribution of light emitted from the light guide of FIG. 8 by a prism of the turning film of FIG. 8 in accordance with aspects of the present disclosure.

Additional details with respect to backlight unit 104 are described below with reference to FIGS. 9-11 in accordance with one embodiment. FIG. 9 generally depicts details regarding light emitted from light guide 106 and the redirection of such light by a single prism 118 in accordance with method 122 generally depicted in FIG. 10. Additionally, FIG. 11 generally depicts an example of anisotropic optical features formed on a surface of light guide 106 for emitting light in a broad pattern suitable for turning by turning film 120.

By way of example, and as generally depicted in FIG. 9, light 124 may be emitted from emission surface 110 of light guide 106 toward prism 118. Light 124 falls within distribution range 116, which includes peak transmittance direction 126. Whereas the distribution of light from light guide 72 is quite narrow and at a steep incident angle, light 124 emitted by light guide 106 falls over broader distribution range 116 and includes shallower incident angles. For instance, angle of incidence 130 of peak transmittance direction 126 may be between fifty degrees and seventy-five degrees measured from normal 132, rather than approximately equal to seventy-five degrees as discussed above with respect to light guide 72. More particularly, in certain embodiments, angle of incidence 130 may be between about fifty-five degrees to about sixty-five degrees, between about fifty-seven degrees to about sixty-three degrees, or may be substantially equal to sixty degrees.

Broad distribution range 116 may include an angular range, generally represented by angle 134, greater than that provided by prism light guide 72. For example, the angular range of distribution 116 within a plane perpendicular to both light source 108 and emission surface 110 of light guide 106 (e.g., the field of view depicted in FIG. 9) may be greater than thirty degrees. In various embodiments, this angular range may be between about thirty-five degrees and about ninety degrees, such as approximately: thirty-five degrees, forty degrees, forty-five degrees, fifty degrees, fifty-five degrees, sixty degrees, sixty-five degrees, seventy degrees, seventy-five degrees, eighty degrees, eighty-five degrees, or ninety degrees. By way of further example, in one embodiment the angular range represented by angle 134 may be approximately fifty degrees wide, and may be substantially located between incidence angles of thirty-five degrees and eighty-five degrees with respect to normal 132, as generally represented by angles 136 and 138. Further, in this or other embodiments, distribution range 116 may be substantially centered on peak transmittance direction 126 (i.e., approximately half of the light within distribution 116 includes incident angles greater than angle 130, while the other approximate half includes incident angles less than angle 130).

Figure 10:
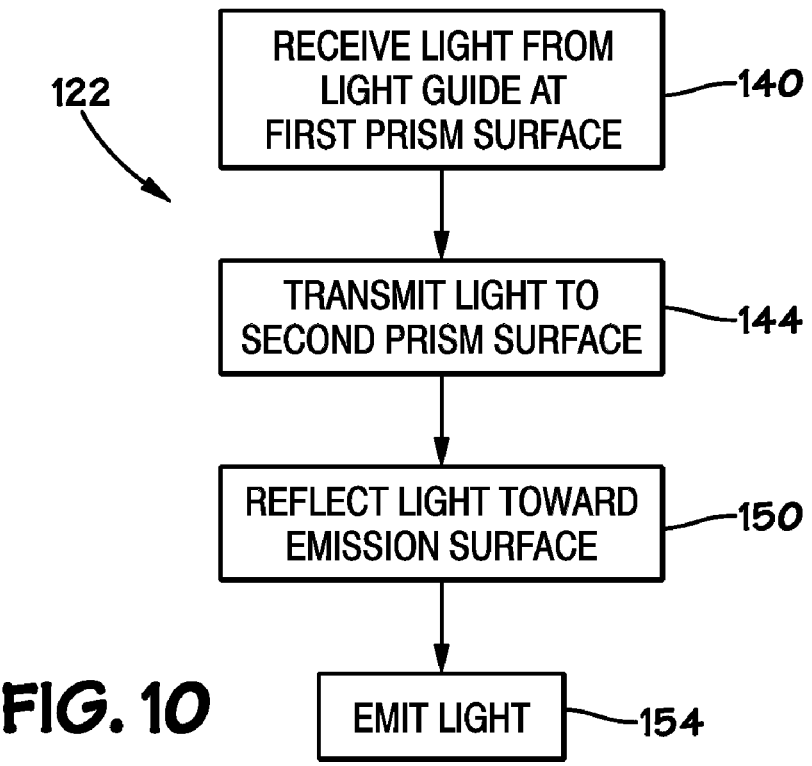
FIG. 10 is a flowchart representative of operation of the prism of FIG. 9 in receiving and redirecting light from the light guide in accordance with aspects of the present disclosure.
Figure 11:
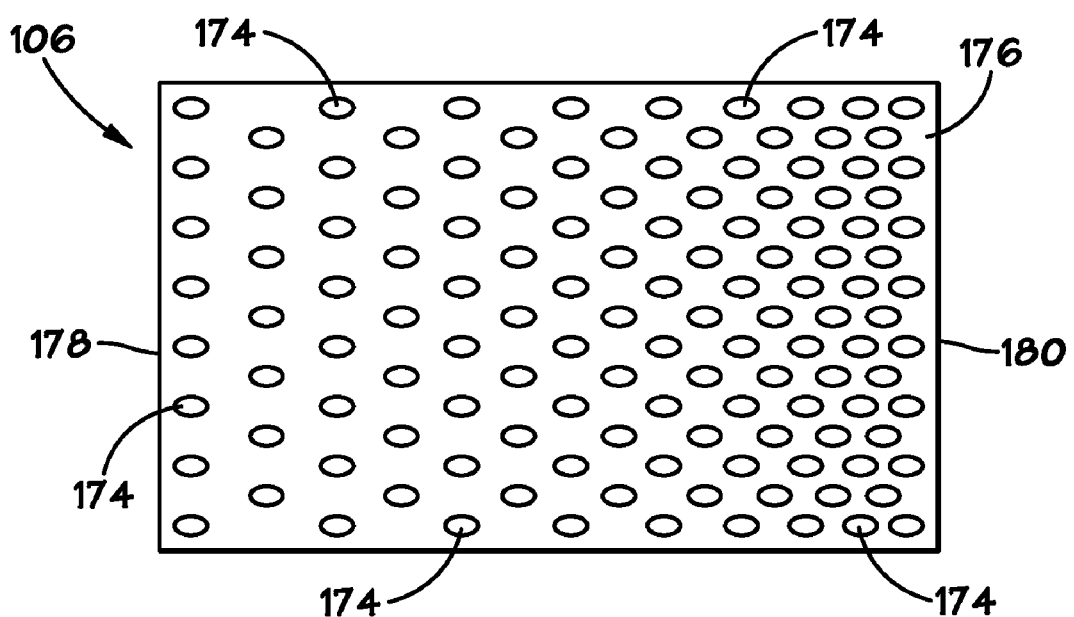
FIG. 11 is a top plan view of the light guide of FIGS. 8 and 9, which includes anisotropic optical elements to emit light over a broad distribution range in accordance with aspects of the present disclosure.

As generally indicated by reference numeral 140 in FIG. 10, light 124 from light guide 106 may be received at first surface 142 of prism 118. Light 124 incident on first surface 142 may be refracted and transmitted to second surface 148 of prism 118, as generally represented by reference numeral 144. Refracted light 146 may be reflected from second surface 148, as generally indicated by reference numeral 150, and this reflected light 152 may be emitted from emission surface 156 of turning film 120, as generally indicated by reference numeral 154. Further, light 152 may then pass through any additional layers of backlight unit 104 or a display (e.g., LCD 34), such as diffuser 158 (FIG. 8) and various layers of LCD panel 42 (FIG. 4). It is noted that diffuser 158 may function to partially scatter light received from turning film 120 and provide a more uniform light distribution from backlight unit 104. Further, the inclusion of diffuser 158 may prevent or reduce the magnitude of moiré patterns, which may otherwise result from interference between prisms 118 and pixels of LCD panel 42, in images displayed by LCD 34. In some embodiments, the haze value of diffuser 158 may be thirty percent or greater, although this value may be smaller in other embodiments.

First and second surfaces 142 and 148 of prism 118 may intersect at apex 162, which generally defines apex angle 164. In contrast to turning film 76 (FIG. 6) having prisms 80 with apex angles 102 greater than sixty-five degrees (e.g., sixty-eight degrees), apex angle 164 of prism 118 depicted in FIG. 9 includes a smaller apex angle 164 less than sixty-five degrees, such as between about fifty degrees and sixty-five degrees. More particularly, in one embodiment apex angle 164 is substantially equal to sixty degrees, although other apex angles 164, such as any other angle between about fifty degrees and sixty-five degrees, may be employed in full accordance with the present techniques.

Rays of light 152 may be emitted at various angles 160 with respect to the base of prism 118 or turning film 120. The resulting angle 160 for a particular ray of light depends on various geometric parameters, such as angle of incidence 130 for the particular light ray emitted from light guide 106 and various aspects of prism 118 (e.g., apex angle 164, base angles of prism 118, and so forth). Some or all prisms 118 of turning film 120 may be symmetric about a line or plane of symmetry, as generally represented by reference numeral 166, or may be asymmetric. For instance, such symmetric prisms 118 may include an axial cross-section generally in the form of an isosceles triangle, with substantially identical base angles that are different than apex angle 164, or generally in the form of an equilateral triangle having base angles substantially identical to each other and to apex angle 164. Prism 118 may be configured in some embodiments such that peak light distribution occurs along a common normal of the base of prism 118, emission surface 156, and LCD panel 42 (i.e., such that peak light distribution is orthogonal to such surfaces), or may be configured such that peak light distribution occurs at a non-perpendicular angle 160 with respect to such surfaces.

As noted above, and in contrast to light guide 72, light guide 106 may include various anisotropic optical elements to provide a broader distribution of light at generally shallower angles of incidence to turning film 120. For example, as depicted in FIG. 11 in accordance with one embodiment, light guide 106 includes anisotropic optical elements 174, such as generally elongated (e.g., elliptical or ellipsoid) lenses, formed on surface 176 of light guide 106. For example, such anisotropic optical elements 174 may be formed on one or both of emission surface 110 and lower surface 112 of light guide 106. Light from light source 108 may be received at lateral surface 178 and may generally propagate through light guide 106 toward opposite surface 180 by way of total internal reflection. Anisotropic optical elements 174, such as elongated lenses, may disrupt such total internal reflection and generally emit light in distribution patterns 116 as described above. Such elongated lenses or other anisotropic optical elements may be arranged in a pattern on surface 176 or may be randomized. Further, in one embodiment, the relative density of optical elements 174 on surface 176 may increase as a function of distance from lateral surface 178 to facilitate evenness of light emission from light guide 106. Although anisotropic optical elements 174 are generally depicted as elongated lenses in the present illustrated embodiment, any other suitable anisotropic elements (e.g., various prisms) capable of providing light distribution 116 may be used in full accordance with the present techniques.

Figure 12:
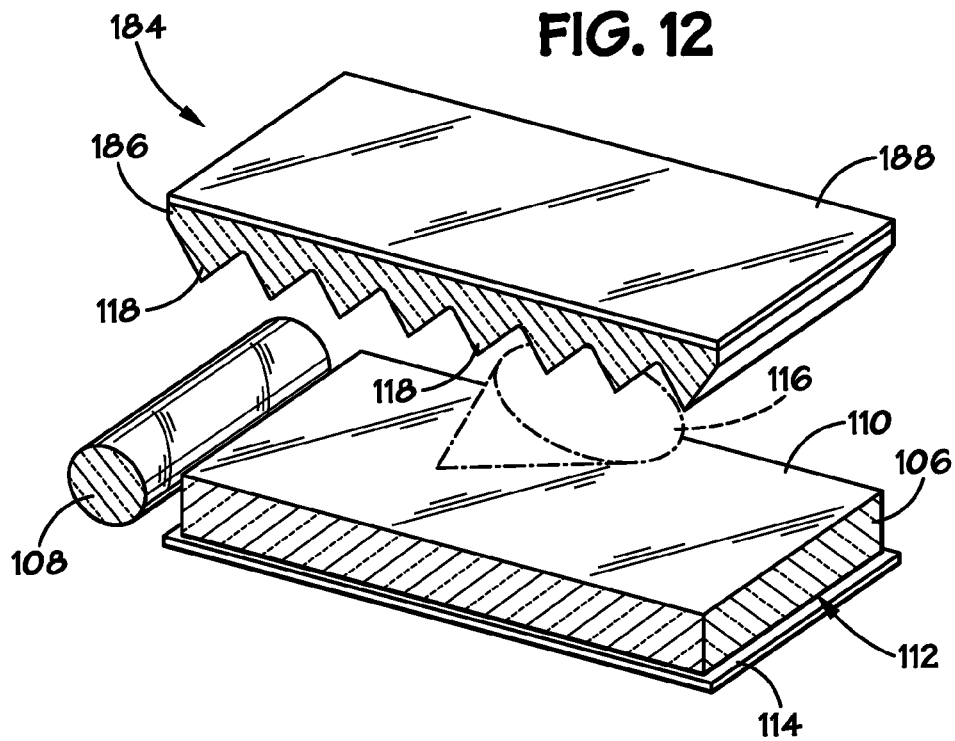
FIG. 12 is a partially exploded view generally depicting a backlight unit having a light guide that emits light over a broad distribution range and a multi-function film in accordance with aspects of the present disclosure.

Additional embodiments of various backlight units in accordance with the present techniques are depicted in FIGS. 12-14. For instance, as depicted in FIG. 12, backlight unit 184 may include multi-function film 186 that operates to both turn and diffuse light received from light guide 106. For example, light guide 106 may receive light from light source 108, and may include emission surface 110 and lower surface 112 as generally described above. Light may be emitted from emission surface 110 within distribution range 116 and toward turning prisms 118 of multi-function film 186. Prisms 118 may operate to redirect received the light in the manner discussed above with respect to FIGS. 9 and 10. Additionally, multi-function film 186 may also include an integrated diffusion layer 188 for diffusing the redirected light, rather than a separate diffuser 158 (FIG. 8). In some embodiments, the haze value of integrated diffusion layer 188 may be thirty percent or greater, although lesser values may be employed in other embodiments. The use of multi-function film 186, rather than separate turning film 120 and diffuser 158, may result in a reduction in the thickness of backlight unit 184 in comparison to backlight unit 104.

In other embodiments, it may be desirable to omit diffusion layers (e.g., diffuser 158 and/or integrated diffusion layer 188) over prisms 118, as generally illustrated with respect to backlight unit 194 in FIG. 13. In one such embodiment, diffusion may instead be accomplished by applying certain haze to some other layer of the display, such as a polarizing layer of LCD panel 42. In yet another embodiment generally depicted in FIG. 14, backlight unit 204 may include turning film 206 having prisms 118 different from one another, and generally provided with certain disorder that may, among other things, reduce or prevent moiré patterns in images rendered on display 34 including such backlight unit 204. The disorder of prisms 118 may be provided through variation of any suitable parameter, such as prism angles, height, orientation, and the like; by providing a random speckle pattern on surfaces of prisms 118; or in some other fashion. As may be appreciated from the above discussion of other embodiments, light received by prisms 118 may be redirected and emitted from emission surface 208 of turning film 206. Backlight unit 204 may include diffuser 158, an integrated diffusion layer (e.g., diffusion layer 188), or may omit such a diffusion layer over prisms 118.

Figure 15:
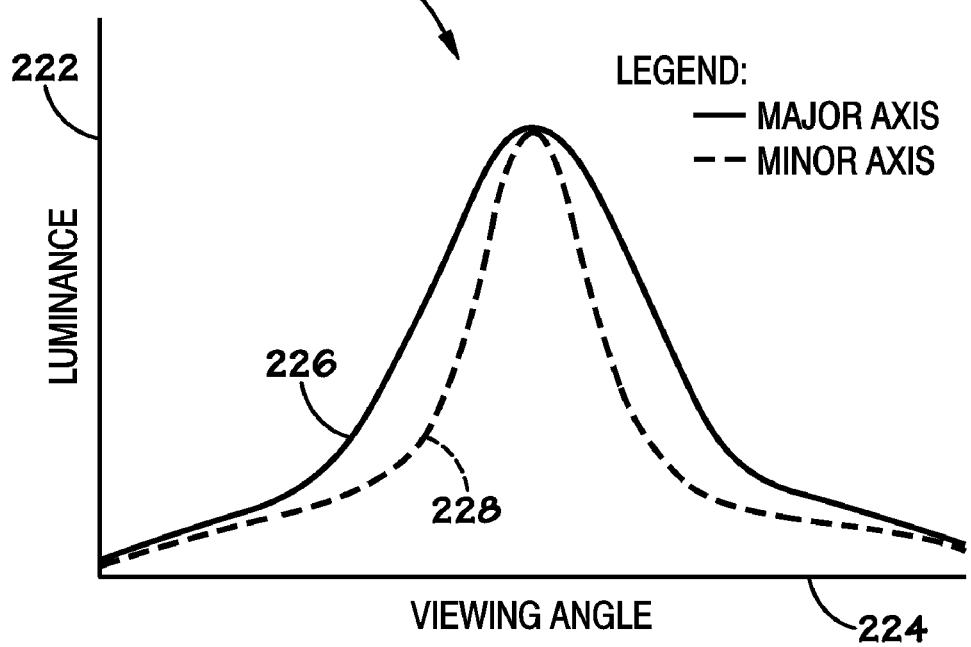
FIG. 15 is a graph representing the luminance of the backlight unit of FIG. 6 as a function of viewing angle along its major and minor axes.
Figure 16:
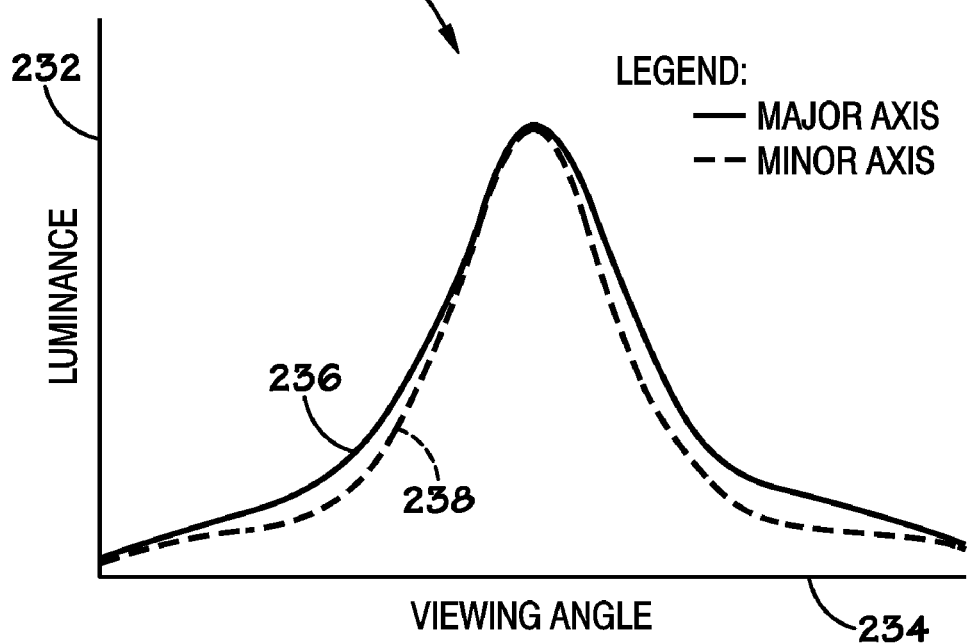
FIG. 16 is a graph generally representing the improvement in minor-axis luminance of a backlight unit emitting a broad distribution of light from a light guide to a turning film provided in accordance with aspects of the present disclosure.

As generally depicted in FIGS. 15 and 16, viewing angles for a display including an edge-lit backlight unit configured in accordance with the present techniques (e.g., backlight units 104, 184, 194, and 204) may be significantly improved in comparison to those for a display incorporating a traditional prism backlight unit, such as backlight unit 68. In FIG. 15, graph 220 generally depicts luminance (represented along vertical axis 222) as a function of viewing angle (represented along horizontal axis 224). Curve 226 generally represents the luminance of the display at different viewing angles along the major axis of the display (e.g., the horizontal axis), while curve 228 generally represents luminance at viewing angles along a minor axis (e.g., the vertical axis) of the display. As generally indicated in graph 220, luminance of a display including a traditional prism backlight unit decreases at a significantly greater rate for changes in viewing angle along the minor axis than changes in the major axis.

Conversely, in one embodiment an edge-lit backlight unit configured in accordance with the present techniques may enable substantially uniform luminance response for changes in viewing angle along the major and minor axes of a display, as generally illustrated in FIG. 16. Graph 230 depicts luminance of such a display as a function of viewing angle along vertical and horizontal axes 232 and 234 of graph 230. Luminance response for variations in viewing angle along a major axis of the display is represented by curve 236, while that for variance in viewing angle along a minor axis of the display is represented by curve 238. As may be determined from a comparison of graphs 220 and 230, improved viewing angles along a minor axis of a display may be obtained through use of an edge-lit backlight unit configured in accordance with the present techniques. Additionally, such an edge-lit backlight unit may provide peak luminance levels greater than that provided by traditional PMMA backlight units by significantly reducing the amount of light lost by the backlight unit. Still further, edge-lit backlight units in accordance with the present techniques may have fewer optical layers, and hence a thinner profile, than traditional PMMA backlight units. For instance, whereas PMMA backlight units may include two prism films and two diffusers, backlight unit 104 includes a single prism film (i.e., turning film 120) and a single diffuser 158, while backlight unit 194 includes a single prism film without a diffuser. In some embodiments, the presently disclosed backlight units may be thinner than traditional PMMA backlight units by twenty-five percent or even more.

Figure 17:
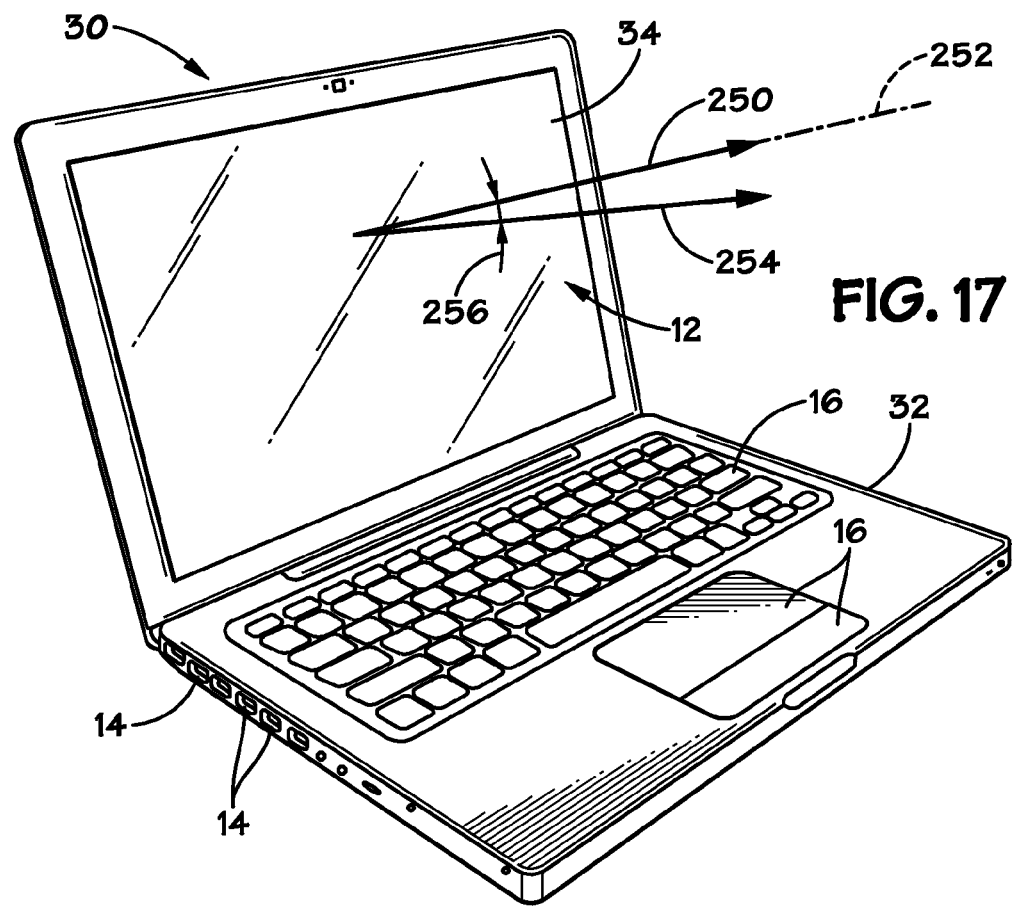
FIG. 17 is a perspective view of a computer generally depicting the possibility of biasing of the peak luminance direction of a backlight unit and a display in accordance with aspects of the present disclosure.

With reference to FIG. 17 provided in accordance with one embodiment, it is noted that peak luminance may occur along normal 252 of display 12 of computer 30 (or of some other electronic device 10), or at a non-orthogonal angle with respect to display 12, depending on the configuration of the backlight unit. For instance, as generally discussed above with respect to FIG. 9, prisms 118 of a turning film in accordance with the present techniques may output light such that peak luminance occurs along a common normal of the turning film and display 12, as generally indicated by reference numeral 250. In other embodiments, however, light guide 106, prisms 118, or other aspects of the backlight unit may be configured to provide biased angular performance, in which peak luminance (generally represented by reference numeral 254) occurs at angle 256 with respect to normal 252.

The specific embodiments described above have been shown by way of example, and it should be understood that these embodiments may be susceptible to various modifications and alternative forms. It should be further understood that the present techniques are not intended to be limited to the particular forms disclosed, but rather to cover all modifications, equivalents, and alternatives falling within the spirit and scope of this disclosure.

What is claimed is:

1. A display backlight unit comprising:
   a light guide configured to receive light from a light source at a first surface and to emit the light from a second surface such that the light emitted from the second surface is at an angle of between thirty-five degrees and eighty-five degrees measured with respect to a normal of the second surface; and
   a turning film disposed over the second surface of the light guide, the turning film including a plurality of prisms configured to receive and redirect the light emitted from the second surface of the light guide.

2. The display backlight unit of claim 1, wherein the angle is between fifty-five and sixty-five degrees.

3. The display backlight unit of claim 2, wherein the angle is substantially sixty degrees.

4. The display backlight unit of claim 1, comprising the light source, wherein the light source includes at least one of a cold-cathode fluorescent lamp or a light-emitting diode.

5. The display backlight unit of claim 1, comprising a diffuser disposed over the turning film.

6. The display backlight unit of claim 1, wherein the turning film includes a diffusing portion configured to diffuse the redirected light received from the plurality of prisms.

7. A display backlight unit comprising:
   a light guide configured to receive light from a light source and to emit the light from an emission surface of the light guide, wherein the light guide includes anisotropic optical elements configured to refract the light received from the light source such that the light emitted from the emission surface is substantially distributed over an angular range, measured with respect to a normal of the emission surface, of greater than thirty-five degrees and less than ninety degrees; and
   a redirection layer disposed over the emission surface for receiving the light from the emission surface of the light guide.

8. The display backlight unit of claim 7, wherein the anisotropic optical elements are disposed on at least one of the emission surface or an additional surface of the light guide opposite the emission surface.

9. The display backlight unit of claim 8, wherein the anisotropic optical elements include substantially ellipsoid lenses.

10. The display backlight unit of claim 7, wherein the angular range is less than sixty degrees.

11. The display backlight unit of claim 10, wherein the angular range is substantially centered at a sixty-degree angle with respect to a normal of the emission surface.

12. The display backlight unit of claim 11, wherein the angular range is substantially located between angles of thirty-five degrees and eighty-five degrees with respect to the normal.

13. A liquid crystal display comprising:
   a liquid crystal display panel; and
   an edge-lit backlight unit configured to output light to the liquid crystal display panel, the backlight unit including:
      a light source;
      a light guide configured to emit light received from the light source, the light guide including optical elements on at least one surface of the light guide that are configured to scatter the light emitted from the light guide within a primary distribution range of thirty-five degrees to eighty-five degrees measured with respect to a normal of an emission surface of the light guide, and wherein the optical elements are further configured to emit light at an angle between fifty-seven degrees and sixty-three degrees with respect to the normal;

a turning film disposed over the light guide and including a plurality of prisms configured to receive light emitted from the light guide and redirect such light toward the liquid crystal display panel, wherein the plurality of prisms includes prisms having apex angles of less than or approximately sixty degrees.

14. The liquid crystal display of claim 13, wherein each prism of the plurality of prisms is symmetric.

15. The liquid crystal display of claim 13, comprising a reflector disposed adjacent an additional surface of the light guide opposite the emission surface and configured to direct light incident on a reflective surface of the reflector toward the emission surface of the light guide.

16. The liquid crystal display of claim 13, wherein the reflector comprises at least one of a specular reflector or a diffuse reflector.

17. An electronic device comprising:
one or more input structures;
a storage structure capable of storing one or more executable routines;
a processor capable of receiving inputs from the one or more input structures and of executing the one or more executable routines; and
a liquid crystal display (LCD) capable of displaying an output of the processor, wherein the LCD includes:
a liquid crystal display panel; and
an edge-lit backlight unit configured to output light to the liquid crystal display panel, the backlight unit including:
a light guiding plate;
a light source adjacent a lateral edge of the light guiding plate; and
a turning film disposed over the light guiding plate, the turning film including a plurality of prisms on a surface of the turning film facing the light guiding plate;
wherein the light guiding plate is configured to receive light from the light source at the lateral edge such that the received light propagates through the light guiding plate and is redirected by lenses of the light guiding plate to emit light to the turning film, and wherein light emitted from an emission surface of the light guiding plate is substantially distributed over an angular range of at least thirty-five degrees and less than ninety degrees measured with respect to a normal of the emission surface.

18. The electronic device of claim 17, wherein the edge-lit backlight unit includes only a single turning film.

19. The electronic device of claim 17, wherein the turning film is configured such that peak light distribution from the LCD occurs at a non-zero angle with respect to a normal of the LCD.

20. The electronic device of claim 17, wherein the electronic device includes at least one of a computer, a monitor, or a handheld electronic device.

21. A method of redirecting light in an edge-lit backlight unit, the method comprising:

emitting light from an emission surface of a light guide of an edge-lit backlight unit such that the light is substantially distributed over an angular range, measured with respect to a normal of the emission surface, of greater than thirty-five degrees and less than eighty-five degrees;

receiving light emitted from the light guide on a first surface of a prism formed on a receiving surface of a turning film;

transmitting the received light to a second surface of the prism, the prism including an apex angle between the first and second surfaces of fifty degrees to sixty-five degrees;

reflecting the transmitted light from the second surface toward an emission surface of the turning film opposite the receiving surface; and emitting the reflected light from the emission surface of the turning film.

22. The method of claim 21, wherein emitting the reflected light from the emission surface of the turning film includes emitting the reflected light such that the emitted light exhibits a peak intensity substantially along a normal of the emission surface.

23. The method of claim 21, wherein receiving light emitted from the light guide includes receiving light emitted from the light guide on respective first surfaces of a plurality of prisms formed on the receiving surface, the plurality of prisms including first and second prisms different from one another.

24. The method of claim 21, wherein receiving light emitted from the light guide includes receiving light emitted from the light guide on respective first surfaces of a plurality of prisms of the receiving surface of the turning film, and wherein the receiving surface is configured to reduce moiré effects on an image generated on a display including the display backlight unit.

25. A display backlight unit comprising:
a light guide configured to receive light from a light source at a first surface and to emit the light from a second surface such that the light emitted from the second surface includes a peak direction of transmittance angle of between forty-five degrees and seventy degrees, wherein the light guide includes anisotropic optical elements including substantially ellipsoid lenses disposed on at least one of the emission surface or an additional surface of the light guide opposite the emission surface configured to refract the light received from the light source; and
a turning film disposed over the second surface of the light guide, the turning film including a plurality of prisms configured to receive and redirect the light emitted from the second surface of the light guide.

26. A display backlight unit comprising:
a light guide configured to receive light from a light source and to emit the light from an emission surface of the light guide, wherein the light guide includes anisotropic optical elements including substantially ellipsoid lenses configured to refract the light received from the light source and which are disposed on at least one of the emission surface or an additional surface of the light guide opposite the emission surface; and
a redirection layer disposed over the emission surface for receiving the light from the emission surface of the light guide.

27. A liquid crystal display comprising:
a liquid crystal display panel; and an edge-lit backlight unit configured to output light to the liquid crystal display panel, the backlight unit including:
- a light source;
- a light guide configured to emit light received from the light source, the light guide including anisotropic optical elements on at least one surface of the light guide that are configured to refract the light emitted from the light guide within a primary distribution range of thirty degrees to eighty-five degrees measured with respect to a normal of an emission surface of the light guide, and wherein the optical elements are further configured to emit light at a peak direction of transmittance angle between fifty-seven degrees and sixty-three degrees with respect to the normal, and wherein the optical elements include substantially ellipsoid lenses; and
- a turning film disposed over the light guide and including a plurality of prisms configured to receive light emitted from the light guide and redirect such light toward the liquid crystal display panel, wherein the plurality of prisms includes prisms having apex angles of less than or approximately sixty degrees.

28. An electronic device comprising:
one or more input structures;
a storage structure capable of storing one or more executable routines;
a processor capable of receiving inputs from the one or more input structures and of executing the one or more executable routines; and
a liquid crystal display (LCD) capable of displaying an output of the processor, wherein the LCD includes:
- a liquid crystal display panel; and
- an edge-lit backlight unit configured to output light to the liquid crystal display panel, the backlight unit including:
  - a light guiding plate;
  - a light source adjacent a lateral edge of the light guiding plate; and
  - a turning film disposed over the light guiding plate, the turning film including a plurality of prisms on a surface of the turning film facing the light guiding plate;
  - wherein the light guiding plate is configured to receive light from the light source at the lateral edge such that the received light propagates through the light guiding plate and is redirected by lenses, including anisotropic substantially ellipsoid lenses, of the light guiding plate to emit light to the turning film, and wherein light emitted from an emission surface of the light guiding plate is distributed over an angular range of at least thirty degrees.

29. A method of redirecting light in an edge-lit backlight unit, the method comprising:
receiving light emitted from a light guide of an edge-lit backlight unit on a first surface of a prism formed on a receiving surface of a turning film, wherein the light guide includes anisotropic elements, and wherein the anisotropic elements include substantially ellipsoid lenses;
transmitting the received light to a second surface of the prism, the prism including an apex angle between the first and second surfaces of fifty degrees to sixty-five degrees;
reflecting the transmitted light from the second surface toward an emission surface of the turning film opposite the receiving surface; and
emitting the reflected light from the emission surface of the turning film.

* * * * *